Patented June 15, 1926.

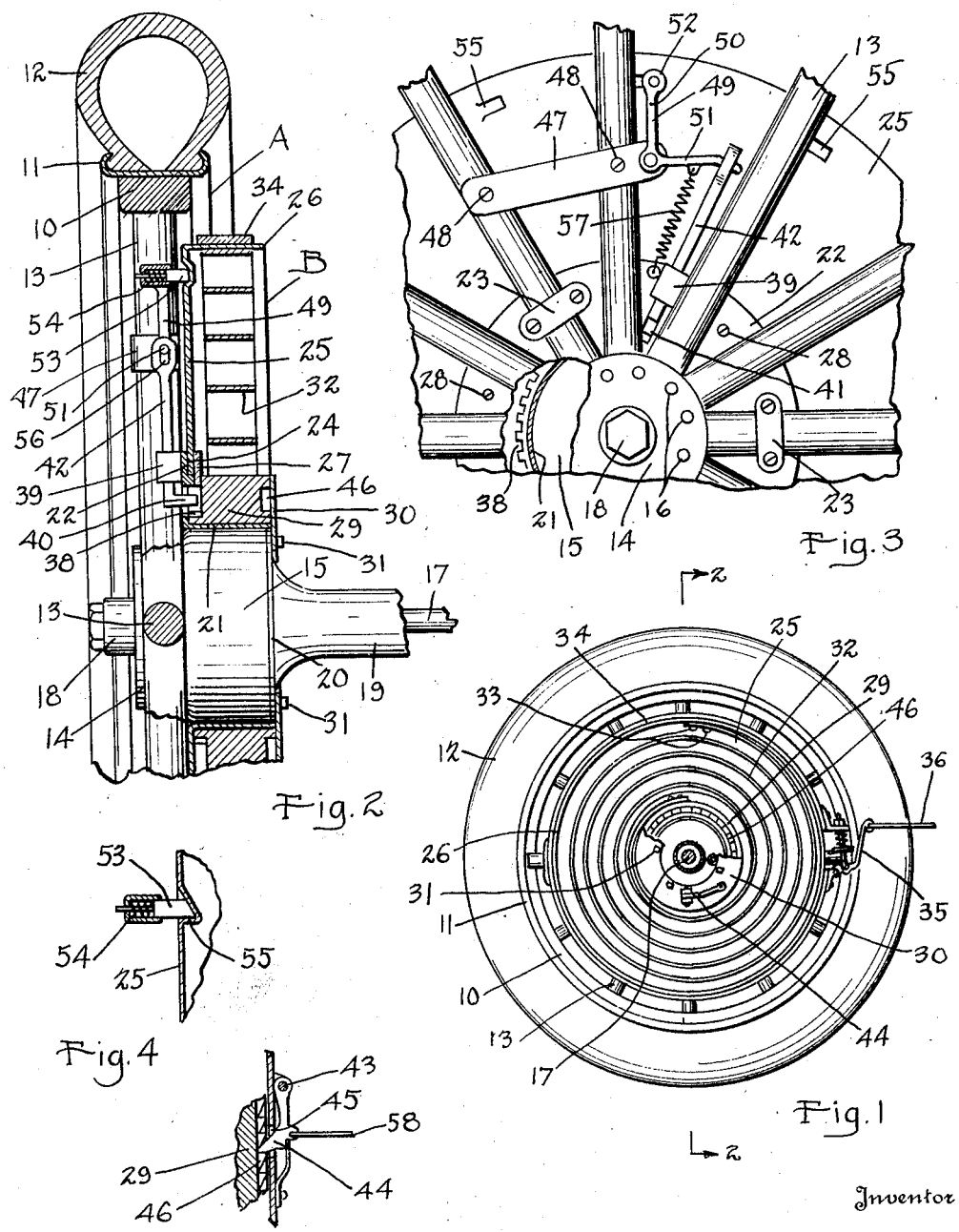

1,589,125

UNITED STATES PATENT OFFICE.

WILLIAM E. DAY, OF ST. PAUL, MINNESOTA.

POWER-CONSERVING DEVICE.

Application filed January 31, 1924. Serial No. 689,820.

My invention relates to power conserving devices and has for its object to provide a device by means of which the power lost in stopping a vehicle may be partially utilized to later start the vehicle.

Another object of my invention is to provide a device adapted to receive and store the energy due to the momentum of a vehicle when the same is being stopped and to release the said energy to start the vehicle at any desired time.

A still further object of the invention resides in attaching to the wheels of a motor vehicle a resilient member adapted to receive the energy expended in stopping or braking the vehicle and to release the same when desired to start the motor vehicle.

A still further object of the invention resides in providing a spiral spring which is adapted to be wound up when the motor vehicle is being stopped and which is adapted to unwind and start the vehicle when desired.

Other objects reside in the particular features of my invention as well as in the detailed construction thereof, which are brought out in the following specification and claims:

In the drawings illustrating my invention in one form:

Figure 1 is a side elevational view of a motor vehicle wheel showing my invention applied thereto.

Figure 2 is a fragmentary sectional view taken on line 2—2 of Figure 1 and drawn to an enlarged scale.

Figure 3 is an elevational view of a portion of the structure shown in Figure 2.

Figures 4 and 5 are detailed views showing the various locking mechanisms of the invention.

In the use of motor vehicles, particularly those employed for busses and similar purposes where a great number of stops are made, considerable energy is expended and lost in starting and stopping the vehicle. My invention provides a means whereby such losses may be reduced by utilizing the energy of the momentum of the vehicle and storing the same in a spiral spring which may thereafter be used for starting the vehicle when desired.

In the drawings I have illustrated only a portion of one of the hind wheels and rear axle of a motor vehicle, such machines being well known in the art. The structure illustrated comprises a rear wheel A consisting of a felly 10 to which is secured a rim 11 in which is mounted the usual pneumatic tire 12. The felly 10 is supported upon a number of spokes 13 which are secured to a flange 14 and a brake drum 15 in the usual manner by means of rivets 16. A shaft 17 secured to the flange 14 and hub 18 of wheel A is journalled within a rear axle housing 19 which has a flange 20 cooperating with the brake drum 15 to enclose the mechanism within the same. In the drawings I have not illustrated the brake mechanism within the drum 15 in detail, this being of usual construction such as is well known in the art.

Upon the brake drum 15 is mounted a sleeve 21 having a flange 22 formed integral therewith and adapted to lie snug up against the inner surfaces of the spokes 13. This flange is secured to the spokes by means of clips 23 passing around the same and secured thereto. Upon the inner surface of the flange 22 is formed a groove 24 in which is rotatably mounted a plate 25 being formed at its outer periphery with an annular flange 26 provided a drum construction B similar to the brake drum 15, excepting of larger dimensions. The plate 25 is held in position by a ring 27 which is secured to the flange 22 by bolts or screws 28. With this construction the drum B is free to rotate relative to the wheel A.

Upon the sleeve 21 is rotatably mounted a hub 29 which is held in place by means of an annular disk 30 passing over the wheel housing 19 and being bolted to the flange 20 by means of bolts 31. This annular disk serves to hold the said hub 29 freely rotatable upon the sleeve 21 in relation to the wheel A or the axle housing 19. Positioned between the flange 26 and hub 29 I provide a spiral spring 32 which is similar to a clock spring, but being of considerably greater dimensions, which spring is riveted to the inner surface of flange 26 by means of rivets 33 and is similarly attached to the hub 29. When either the drum B or hub 29 are rotated and the other held still it can readily be seen that the spring 32 becomes wound up and the energy required to wind the same stored within said spring, being adapted to rotate any object connected therewith when either said hub or drum are released.

For holding the drum 15 from movement I provide a brake band 34 which passes around the exterior periphery thereof. This brake band may be operated by means of lever 35 which is controlled by a brake rod 36 in the usual manner. Upon the actuation of the brake rod 36 the drum B may be completely held from rotation so that when the hub 29 is rotated by means of the wheel A the said spring 32 becomes wound up and the energy required in so winding the spring up becomes stored within the same.

For driving the hub 29 from wheel A the said hub is formed along its side adjacent the flange 22 with a number of radially positioned teeth 38. Upon this flange 22 is attached a boss or bearing 39 in which is slidably mounted a rod 42 carrying a dog 40 extending through an aperture 41 in said plate and being adapted to engage into any of the teeth 38 of hub 29. The boss 39 being fast on flange member 22 which in turn is secured to the wheel A, causes hub 29 to rotate with it when the rod 42 is forced towards the axle of the wheel to bring the dog 40 in contact with the teeth 38. With this construction it can readily be seen that whenever the vehicle is running and the brake rod 36 is manipulated to cause the drum B to become stationary relative to the chassis and rod 42 is so positioned that dog 40 is in engagement with teeth 38, that the hub 29 is caused to rotate which in turn winds up the spring 32 the same as winding up the spring of a clock and storing the energy expended in so winding it up within the spring. In this manner the vehicle is quickly and effectively stopped and all of the energy expended in stopping it stored within the spring 32.

In the invention I have shown only the brake rod 36 for operating the brake band 34; but it can be readily comprehended that this brake band may be operated in conjunction with the ordinary brake of the vehicle so that brake 36 first comes into action to stop the drum B and when the pedal of the vehicle brake is applied, the brake proper comes into action to hold the wheel proper from further motion. As soon as the vehicle has been stopped by means of the spring 32 the emergency brake is set, holding the vehicle in stationary position.

If the brake band 34 is now released and a hub 29 held stationary, drum B tends to rotate in the same direction as the wheel and hub 29 in the opposite direction since the driving effect was imparted to the hub 29. However, as long as the hub 29 remains locked to the wheel by means of the dog 40 the same remains stationary.

In order that the energy stored within the spring 32 may be imparted to the wheel A to propel the same, it becomes necessary to secure drum B to said wheel and to free the hub 29 from said wheel and lock it relative to some fixed portion of the chassis. This is accomplished as follows: Upon the exterior of the annular ring 30 is pivoted at 43 a dog 44 which passes through an opening 45 in said ring where the said dog 45 is adapted to engage a number of ratchet teeth 46 formed in the side of the hub 29. These ratchet teeth are so constructed that the hub 29 is prevented from traveling in the reverse direction, in other words, in the opposite direction to which the vehicle wheel A is traveling.

For locking the drum B to the wheel A I provide a bar 47 which is secured to two of the spokes 13 by means of screws 48. This bar has pivoted to it at one end a bell crank 49 formed with arms 50 and 51. The arm 50 has mounted upon its extreme end a head 52 which has slidably mounted in it a dog 53 held by means of a spring 54 into engagement with the side of the plate 25 of drum B. In this plate are formed a number of notches 55 which are adapted to be engaged by the said dog so that when the drum B is rotated in the same direction as the wheel, these notches, which are best shown in Figure 4, come in contact with the dog 53 and cause the wheel A to rotate together with said drum B.

In order that the wheel A rotate it becomes necessary to disengage the hub 29 from said wheel, which is accomplished as follows: The arm 51 formed on bell crank 49 extends through an eye 56 formed upon the end of the rod 42. A stiff coil spring 57 connects the arm 51 with boss 39 and normally tends to hold the dog 40 in engagement with the teeth 38. Upon releasing the drum 26 by removing pressure from the brake band 34 the drum B immediately commences to travel in the same direction as the wheel. As soon as one of the notches 55 engages the dog 53 the bell crank 49 is oscillated upon its pivot and the arm 51 is caused to be raised, which releases the dog 40 from engagement with the teeth 38 of hub 29. As soon as this occurs the wheel A is free to rotate and as the spring 32 uncoils the energy stored within the same is imparted to the wheel A and the vehicle caused to be started. After the vehicle commences to run and the energy in spring 32 expended, both the drum B and the hub 29 rotate freely with said wheel A in a forward direction, the pawl or dog 44 clicking upon the teeth 46.

In order to permit the vehicle to back up a cord or cable 58 is attached to the dog 43 by means of which the same may be withdrawn from engagement with the teeth 46. This cord may if desired be connected to the gear shift lever of the vehicle so that the same becomes automatically withdrawn upon shifting of the gear shift lever into reverse, or the same may be manually controlled as desired.

Upon applying the brake to the drum B wheel A continues to travel which causes the dog 53 as illustrated in Figure 4 to ride upon the exterior surface of plate 25, which together with the action of spring 57 forces the rod 42 downwardly and causes the dog 40 to engage in the teeth 38. This immediately causes hub 29 to rotate in the same direction as the wheel A, while the dog 44 clicks upon the teeth 46. As soon as the brake upon the drum B is released the same operation takes place as before described.

The advantages of my invention are manifest. An extremely simple and effective device is provided by means of which the energy normally lost in the starting and stopping of a motor vehicle may be utilized. In addition, the wear on brake bands may be greatly reduced as the energy absorbed in the braking or stopping of the vehicle is absorbed by the springs instead of expended in heat in the brake band. The stopping of the vehicle is very effectively and smoothly accomplished as the resisting force of the spring at first is very slight and gradually increases as the same becomes wound up. In this manner the stopping of the vehicle does not jerk the passengers out of their seats or in any other way cause them discomfort. The same is to a large extent true in the starting of the vehicle since the maximum force exerted by the spring is applied when the vehicle is standing stationary when it requires the most effort to bring the same in motion. As soon as the vehicle gets moving the force in the spring is reduced so that the acceleration of the vehicle is such as will produce the most satisfactory results.

In accordance with the patent statutes I have described my invention, illustrating the best embodiment thereof, but I desire to have it understood that the invention can be carried out by other means and applied to uses other than those above set forth within the scope of the following claims.

I claim:

1. In combination with the chassis and wheel of a motor vehicle, a spring positioned adjacent said wheel, means for holding one end of said spring from movement relative to said chassis, means for connecting the other end of said spring to said wheel and means for subsequently releasing said first named end of said spring from said chassis and connecting it to said wheel and for disconnecting the latter end of said spring from said wheel and holding it from movement relative to said chassis.

2. In combination with a fixed element of a motor vehicle and a wheel thereof, a spiral spring, means for driving one end of said spiral spring from said wheel, means for holding the other end of said spiral spring from rotation relative to said fixed portion of said motor vehicle, means for driving said wheel from said fixed end of said spring, means for holding said driven end of said spring from rotation relative to said fixed portion of said motor vehicle in one direction and means for disengaging said driven end of said spring from said wheel.

WILLIAM E. DAY.